United States Patent
Lei et al.

(10) Patent No.: US 12,507,278 B2
(45) Date of Patent: Dec. 23, 2025

(54) METHOD AND APPARATUS FOR CONTROL CHANNEL DESIGN FOR DATA TRANSMISSION ON UNLICENSED SPECTRUM

(71) Applicant: LENOVO (BEIJING) LIMITED, Beijing (CN)

(72) Inventors: Haipeng Lei, Beijing (CN); Alexander Golitschek Edler von Elbwart, Darmstadt (DE)

(73) Assignee: Lenovo (Beijing) Limited, Beijing (CN)

( * ) Notice: Subject to any disclaimer, the term of this patent is extended or adjusted under 35 U.S.C. 154(b) by 686 days.

(21) Appl. No.: 17/279,046

(22) PCT Filed: Nov. 8, 2018

(86) PCT No.: PCT/CN2018/114656
§ 371 (c)(1),
(2) Date: Mar. 23, 2021

(87) PCT Pub. No.: WO2020/093334
PCT Pub. Date: May 14, 2020

(65) Prior Publication Data
US 2022/0046701 A1 Feb. 10, 2022

(51) Int. Cl.
*H04W 74/0808* (2024.01)
*H04L 27/00* (2006.01)
(Continued)

(52) U.S. Cl.
CPC ..... *H04W 74/0808* (2013.01); *H04L 27/0006* (2013.01); *H04W 16/14* (2013.01); *H04W 72/23* (2023.01)

(58) Field of Classification Search
CPC . H04W 74/0808; H04W 16/14; H04W 72/23; H04W 72/0453; H04W 74/0833;
(Continued)

(56) References Cited

U.S. PATENT DOCUMENTS 10,827,487 B2 * 11/2020 Huang ................. H04W 72/12
11,445,498 B2 * 9/2022 Alriksson ............ H04L 5/0007
(Continued)

OTHER PUBLICATIONS

CN42156-OA2, "Office Action", Sep. 16, 2023, pp. 1-8.
(Continued)

*Primary Examiner* — Harun Chowdhury
(74) *Attorney, Agent, or Firm* — Kunzler Bean & Adamson (57) ABSTRACT

The present application relates to method and apparatus for downlink control channel design for data transmission on unlicensed spectrum. One embodiment of the present disclosure provides a method comprising: dividing a carrier bandwidth into a plurality of bandwidth portions, wherein each of the plurality of bandwidth portions includes a control region for transmitting control channel; performing a channel access test for each of the plurality of bandwidth portions; determining a first bandwidth portion from the plurality of bandwidth portions according to channel access test results of the plurality of bandwidth portions; transmitting a first control channel in a first control region of the first bandwidth portion, wherein the first control channel is used for scheduling a data transmission in one or more bandwidth portions of the plurality of bandwidth portions.

19 Claims, 5 Drawing Sheets

(51) Int. Cl.
  *H04W 16/14* (2009.01)
  *H04W 72/23* (2023.01)
(58) Field of Classification Search
  CPC ... H04L 27/0006; H04L 5/0092; H04L 5/001; H04L 5/0053
  USPC .......................................... 370/252, 329, 336
  See application file for complete search history.

(56) References Cited

U.S. PATENT DOCUMENTS

| | | | |
|---|---|---|---|
| 2012/0327883 A1* | 12/2012 | Yang | H04W 74/0833 370/329 |
| 2018/0132243 A1 | 5/2018 | Yang et al. | |
| 2018/0255578 A1 | 9/2018 | Kim et al. | |
| 2018/0352537 A1* | 12/2018 | Zhang | H04W 72/04 |
| 2019/0116592 A1* | 4/2019 | Moon | H04L 5/0092 |
| 2020/0245166 A1* | 7/2020 | Kwak | H04B 7/024 |
| 2020/0367253 A1* | 11/2020 | Kim | H04W 24/08 |
| 2021/0409159 A1* | 12/2021 | Zhu | H04L 1/1861 |

OTHER PUBLICATIONS

Samsung, "Corrections on PDCCH Structure", 3GPP TSG RAN WG1 Meeting #93 R1-1806728, May 21-25, 2018, pp. 1-4.
Spreadtrum Communications, "Remaining issues on bandwidth parts and carrier aggregation", 3GPP TSG RAN WG1#94 R1-1808805, Aug. 20-24, 2018, pp. 1-12.
Intel Corp., "Alternative Implementation of the 6-1 BWP UE feature requirement", 3GPP TSG RAN WG2 Meeting #AH R2-1810408, Jul. 2-6, 2018, pp. 1-6.
Motorola Mobility, Lenovo, Feature lead summary foor NR-U DL Signals and Channels, 3GPP TSG RAN WG1 Meeting 94bis, R1-1811911, Oct. 8-12, 2018, pp. 1-17, Chengdu, China.
Huawei, Hisilicon, DL channels and signals in NR unlicensed band, 3GPP TSG RAN WG1 Meeting #94bis, R1-1810124, Oct. 8-12, 2018, pp. 1-7, Chengdu, China.
International Searching Authority, "Notification of Transmittal of the International Search Report and the Written Opinion of the International Searching Authority, or the Declaration", PCT/CN2018/114656, Nov. 8, 2018, pp. 1-6.
3GPP, 3rd Generation Partnership Project; Technical Specification Group Radio Access Network; Frame structure for NR-U, 3GPP R1-1811298, Oct. 2018, pp. 1-10.
3GPP, 3rd Generation Partnership Project; Technical Specification Group Radio Access Network; Frame structure for NR-U, 3GPP R1-1813360, Nov. 2018, pp. 1-5.
3GPP, 3rd Generation Partnership Project; Technical Specification Group Radio Access Network; On downlink transmission detection in NR-U, 3GPP R1-1808272, Aug. 2018, pp. 1-6.
Nokia et al., "On DL Signals and Channels for NR-U", 3GPP TSG RAN WG1 Meeting #94bis R1-1810622, Oct. 8-12, 2018, pp. 1-14.

\* cited by examiner

Fig. 1

| 201 |
|---|
| 200-2 | 202 |
| 200-3 | 203 |
| 204 |

Fig. 2

| 300-1 | 301 |
|---|---|
| 300-2 | 302 |
| 300-3 | 303 |
| 300-4 | 304 |

METHOD AND APPARATUS FOR CONTROL CHANNEL DESIGN FOR DATA TRANSMISSION ON UNLICENSED SPECTRUM

TECHNICAL FIELD

The present disclosure generally relates to a method and apparatus for communication, and especially to a method and apparatus for communication with 3GPP 5G new radio (NR) access on an unlicensed spectrum (NR-U).

BACKGROUND OF THE INVENTION

Listen Before Talk or sometimes called Listen Before Transmit (LBT) is a channel access technique, and is used for transmission on an unlicensed spectrum. In order to achieve fair coexistence with other wireless systems, LBT is required before a transmitter starts the transmission on an unlicensed spectrum. LBT is executed by performing energy detection on a certain channel. If the detected power of the channel is below a predefined threshold, LBT is successful, which suggests that the channel is deemed as empty and available for transmission. Only when LBT is successful, can the transmitter start the transmission on the channel and occupy the channel up to the Maximum Channel Occupancy Time (MCOT); otherwise, the transmitter cannot start the transmission and will continue to perform LBT until a successful LBT is obtained.

In 5G NR, very wide bandwidth is supported, for example, up to 100 MHz bandwidth for Frequency Range 1 (FR1, 450 MHz-6000 MHz) and up to 400 MHz bandwidth for Frequency Range 2 (FR2, 24250 MHz-52600 MHz). The operating bandwidth is divided into several small bandwidth portions with bandwidth of 20 MHz, and LBT is performed on each bandwidth.

If there are more than one bandwidth portions pass the LBT test, it may be enough to select one bandwidth portion and transmit the control channel in a Control Resource Set (CORESET) in the selected bandwidth portion, so as to schedule data transmissions. There is a need for CORESET configuration which can enhance the efficiency in spectrum utilization and simplify UE blind detection.

BRIEF SUMMARY OF THE INVENTION

One embodiment of the present disclosure provides a method comprising: dividing a carrier bandwidth into a plurality of bandwidth portions, wherein each of the plurality of bandwidth portions includes a control region for transmitting control channel; performing a channel access test for each of the plurality of bandwidth portions; determining a first bandwidth portion from the plurality of bandwidth portions according to channel access test results of the plurality of bandwidth portions; transmitting a first control channel in a first control region of the first bandwidth portion, wherein the first control channel is used for scheduling a data transmission in one or more bandwidth portions of the plurality of bandwidth portions.

Another embodiment of the present disclosure provides a method comprising: dividing a carrier bandwidth into a plurality of bandwidth portions, wherein each of the plurality of bandwidth portions includes a control region for control channel monitoring; identifying a first bandwidth portion from the plurality of bandwidth portions; and receiving a first control channel in a first control region of the first bandwidth portion, wherein the first control channel is used for scheduling a data transmission in one or more bandwidth portions of the plurality of bandwidth portions.

Yet another embodiment of the present disclosure provides an apparatus comprising: at least one non-transitory computer-readable medium having computer executable instructions stored therein; at least one receiver; at least one transmitter; and at least one processor coupled to the at least one non-transitory computer-readable medium, the at least one receiver and the at least one transmitter; wherein the computer executable instructions are programmed to implement a method comprising: dividing a carrier bandwidth into a plurality of bandwidth portions, wherein each of the plurality of bandwidth portions includes a control region for transmitting control channel; performing a channel access test for each of the plurality of bandwidth portions; determining a first bandwidth portion from the plurality of bandwidth portions according to channel access test results of the plurality of bandwidth portions; transmitting a first control channel in a first control region of the first bandwidth portion, wherein the first control channel is used for scheduling a data transmission in one or more bandwidth portions of the plurality of bandwidth portions.

Yet another embodiment of the present disclosure provides an apparatus comprising: at least one non-transitory computer-readable medium having computer executable instructions stored therein; at least one receiver; at least one transmitter; and at least one processor coupled to the at least one non-transitory computer-readable medium, the at least one receiver and the at least one transmitter; wherein the computer executable instructions are programmed to implement a method comprising: dividing a carrier bandwidth into a plurality of bandwidth portions, wherein each of the plurality of bandwidth portions includes a control region for control channel monitoring; identifying a first bandwidth portion from the plurality of bandwidth portions; and receiving a first control channel in a first control region of the first bandwidth portion, wherein the first control channel is used for scheduling a data transmission in one or more bandwidth portions of the plurality of bandwidth portions.

DETAILED DESCRIPTION OF THE INVENTION

The detailed description of the appended drawings is intended as a description of the currently preferred embodiments of the present invention, and is not intended to represent the only form in which the present invention may be practiced should be understood that the same or equivalent functions may be accomplished by different embodiments that are intended to be encompassed within the spirit and scope of the present invention.

Embodiments provide a method and apparatus for downlink (DL) or uplink (UL) control channel design for data transmission on unlicensed spectrum. To facilitate understanding, embodiments are provided under specific network architecture and new service scenarios, such as 3GPP 5G, 3GPP Long Term Evolution (LTE) Release 8 and so on. Persons skilled in the art know very well that, with the development of network architecture and new service scenarios, the embodiments in the present disclosure are also applicable to similar technical problems.

Figure 1:
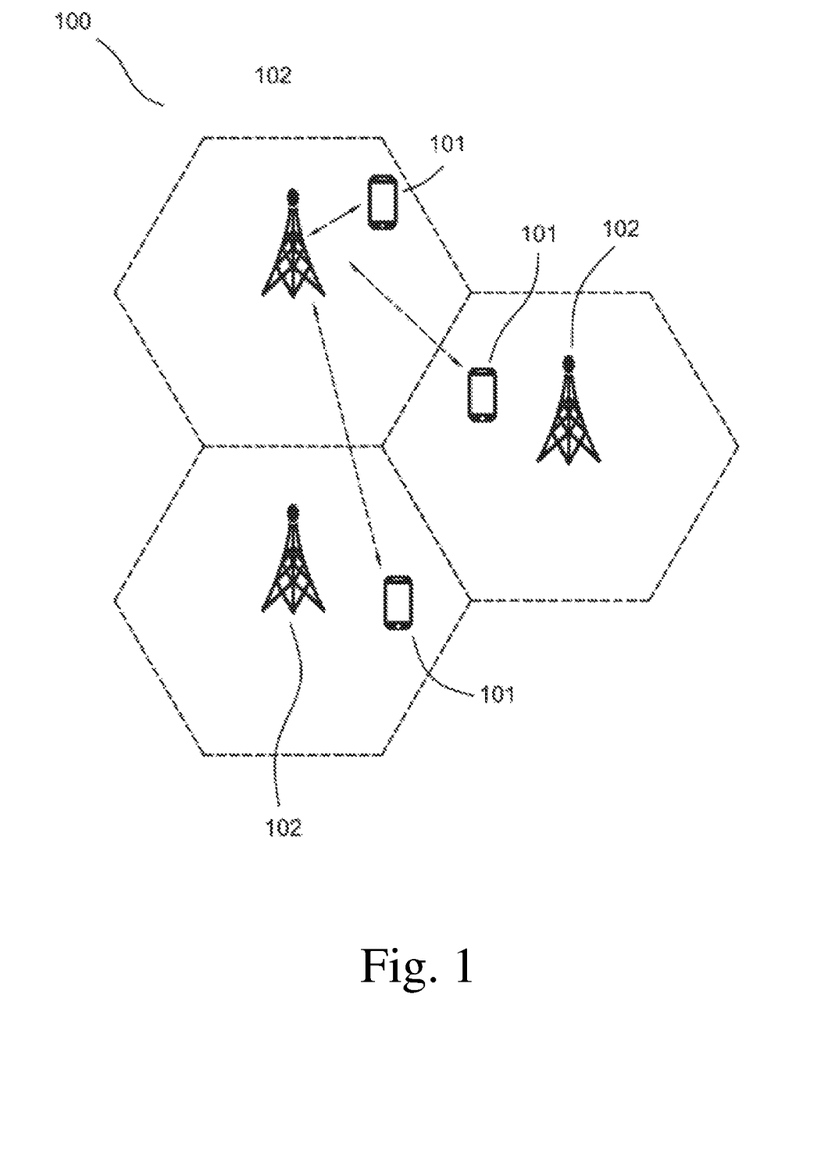
FIG. 1 illustrates a wireless communication system 100 according to an embodiment of the present disclosure.

FIG. 1 depicts a wireless communication system 100 according to an embodiment of the present disclosure.

As shown in FIG. 1, the wireless communication system 100 includes UEs 101 and BSs 102. In particular, the wireless communication system 100 includes three UEs 101 and three BSs 102 for illustrative purpose. Even though a specific number of UEs 101 and BSs 102 are depicted in FIG. 1, one skilled in the art will recognize that any number of UEs 101 and BSs 102 may be included in the wireless communication system 100.

The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs 101 include wearable devices, such as smart watches, fitness bands, optical head-mounted displays, or the like. Moreover, the UEs 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UEs 101 may communicate directly with the BSs 102 via uplink (UL) communication signals.

The BSs 102 may be distributed over a geographic region. In certain embodiments, each of the BSs 102 may also be referred to as an access point, an access terminal, a base, a macro cell, a Node-B, an enhanced Node B (eNB), a gNB, a Home Node-B, a relay node, or a device, or described using other terminology used in the art. The BSs 102 are generally part of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In one embodiment, the wireless communication system 100 is compatible with the 5G new radio (NR) of the 3GPP protocol, wherein the BSs 102 transmit data using an orthogonal frequency division multiplexing (OFDM) modulation scheme on the DL and the UEs 101 transmit data on the UL using a single-carrier frequency division multiple access (SC-FDMA) or OFDM scheme. More generally, however, the wireless communication system 100 may implement some other open or proprietary communication protocols, for example, WiMAX, among other protocols.

In other embodiments, the BSs 102 may communicate using other communication protocols, such as the IEEE 802.11 family of wireless communication protocols. Further, in some embodiments, the BSs 102 may communicate over licensed spectrums, whereas in other embodiments the BSs 102 may communicate over unlicensed spectrums. The present disclosure is not intended to be limited to the implementation of any particular wireless communication system architecture or protocol. In another embodiment, the BSs 102 may communicate with the UEs 101 using the 3GPP 5G protocols.

In the DL data transmission, the BS 102 may transmit Physical Downlink Control Channel (PDCCH) to the UE 101 for scheduling downlink data transmission in a Physical Downlink Shared Channel (PDSCH) to the UE 101. The UE 101 may transmit ACK or NACK corresponding to the PDSCH, wherein the ACK or NACK is carried by Physical Uplink Control Channel (PUCCH). In the UL data transmission, the BS 102 may transmit Physical Downlink Control Channel (PDCCH) to the UE 101 for scheduling uplink data transmission in a Physical Uplink Shared Channel (PUSCH), and the UE 101 may transmit the PUSCH to the BS 102. In the following paragraphs, DL data transmission is utilized to explain some embodiments of the present disclosure. However, the present disclosure is not limited to DL data transmission (i.e. may be used for UL data transmission).

In NR-U, the PDCCH or PUCCH is transmitted in a bandwidth portion which passes the LBT test. In one embodiment, the bandwidth portion is named as a subband and each subband may have the same bandwidth in frequency (e.g., 20 MHz bandwidth). In another embodiment, the bandwidth portion is also named as a bandwidth part (BWP) and each BWP may have the same bandwidth in frequency (e.g., 20 MHz bandwidth). In a third embodiment, the bandwidth portion may be named as a LBT bandwidth unit and each LBT bandwidth unit may have the same bandwidth in frequency (e.g., 20 MHz bandwidth). The LBT test on the bandwidth portion includes different types of operations. For example, one type of the operation is a complete LBT Cat.4 operation with a random backoff counter selected from a variable contention window (also named type 1 UL channel access procedure in TS36.213), another type of the operation is a one-shot LBT operation with at least 25 us sensing interval (also named type 2 UL, channel access procedure in TS36.213). In one embodiment, the UE or gNB randomly selects a bandwidth portion from the allocated bandwidth portions, and performs the complete LBT Cat.4 operation on this bandwidth portion. Before the LBT Cat.4 operation is completed, the UE performs the one-shot LBT operation on every other bandwidth portions of the allocated bandwidth portions.

One objective of the present disclosure is to enhance the efficiency in spectrum utilization by configuring a control region for each bandwidth portion. The control region may be a control resource set (CORESET) or other resources for transmitting control signals. In the following paragraphs, CORESET is utilized to explain some embodiments of the present disclosure. However, the control region in present disclosure is not limited to CORESET. CORESET is a time-frequency resource in which UE tries to decode candidate control channels using one or more search spaces. A CORESET consists of multiple resource blocks in frequency domain and one, two or three OFDM symbols in time domain. The size and location of a CORESET in the time-frequency domain is semi-statically configured by the network and can thus be set to be smaller than the carrier bandwidth. This is especially important in NR as a carrier can be very wide, up to 400 MHz, and it is not reasonable to assume all devices can receive such a wide bandwidth.

Figure 2:
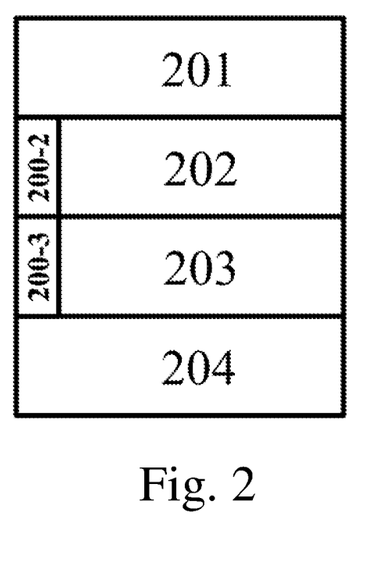
FIG. 2 illustrates a CORESET configuration for bandwidth portion operation according to an embodiment of the present disclosure.

FIG. 2 illustrates a CORESET configuration for bandwidth portion operation according to an embodiment of the present disclosure. FIG. 2 includes four bandwidth portions with the reference numerals as 201, 202, 203, and 204, and two control regions 200-2 and 200-3. The bandwidth portions 201, 202, 203, and 204 may also be bandwidth parts, subbands, etc. The control regions may be CORESET. For example, the reference numeral 200-2 refers to the CORESET of the bandwidth portion 202, and the reference numeral 200-3 refers to the CORESET of the bandwidth portion 204. As shown in FIG. 2, the CORESET is configured within each of bandwidth portions 2 and 3 for transmitting PDCCH and bandwidth portions 1, 2, 3 and 4 may be used to transmit PDSCH. If the channel access tests for bandwidth portions 1 and 4 without CORESET configuration are successful while the channel access tests for the bandwidth portions 2 and 3 with CORESET configuration are not, PDCCH cannot be transmitted. Accordingly, PDSCH on the bandwidth portions 1 and 4 with successful channel access test results cannot be transmitted. Hence, the resources on those bandwidth portions with successful LBT test are wasted.

A simple way to overcome the above defect is to configure one CORESET for each bandwidth portion and the configured CORESET in frequency domain is confined within the bandwidth portion.

Figure 3:
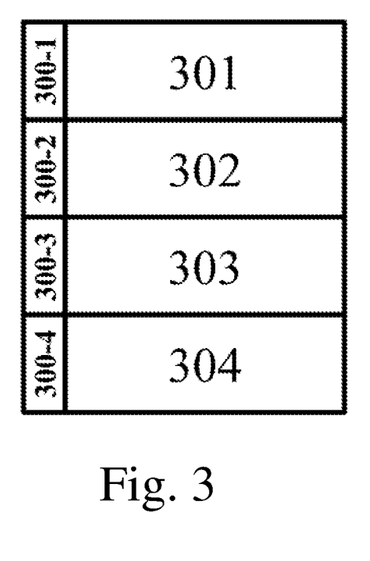
FIG. 3 illustrates another CORESET configuration for bandwidth portion operation according to some embodiments of the present disclosure.

FIG. 3 shows such a configuration. FIG. 3 includes four bandwidth portions with the reference numerals as 301, 302, 303, and 304, and four control regions 300-1, 300-2, 300-3, and 300-4. The bands 301, 302, 303, and 304 may also be bandwidth parts, subbands, etc. The control regions may be CORESET. For example, the reference numeral 300-1 refers to the CORESET of the bandwidth portion 301, the reference numeral 300-2 refers to the CORESET of the bandwidth portion 302, the reference numeral 300-3 refers to the CORESET of the bandwidth portion 303, and the reference numeral 300-4 refers to the CORESET of the bandwidth portion 304. In this way, each bandwidth portion can be used for PDCCH transmission for scheduling PDSCH transmission on the same bandwidth portion (i.e., self-bandwidth portion scheduling) or different bandwidth portion (cross-bandwidth portion scheduling) as long as this bandwidth portion passes channel access test. Meanwhile, in NR Rel-15, up to three CORESETs can be configured for a UE per Bandwidth Part (BWP), One skilled in the art will recognize that the number of CORESETs in a bandwidth portion may be more than one and thus is not limited in the embodiment of FIG. 3, When a wideband BWP has a bandwidth of larger than 60 MHz, the number of CORESETs per BWP needs to be increased. Moreover, the RRC signalling overhead for configuring CORESETs is significant.

According to some embodiments of the present disclosure, the same CORESET configuration is used for each bandwidth portion. Thus, the RRC signalling overhead can be reduced. If there are more than one bandwidth portions pass the channel access tests, it may be enough to select one bandwidth portion with successful channel access test result for transmitting PDCCH in its CORESET for scheduling PDSCH transmissions on the same bandwidth portion or different bandwidth portions.

In this sense, the CORESETs on other bandwidth portions with successful channel access test results can also be used for PDSCH transmission so that the spectrum utilization efficiency can be further improved. Please be advised that when one CORESET on one bandwidth portion does not have enough capacity for multiple PDCCH transmissions, a second bandwidth portion with a successful channel access test result may be also selected for transmitting PDCCH in its CORESET. However, the UE cannot assume other CORESETs are reused for PDSCH transmission before it receives a PDCCH from one CORESET.

Accordingly, it is necessary to indicate the UE whether a CORESET in a bandwidth portion is used for PDSCH transmission or not. With the indication, UE could receive PDSCH from the CORESET if the UE is indicated that the CORESET is used for PDSCH transmission; and UE could perform rate-matching around the CORESET if the UE is indicated that the CORESET is not used for PDSCH transmission.

The present disclosure proposes several approaches to solve the above problems, further improve channel utilization efficiency, and simplify UE blind detection complexity.

Figure 4:
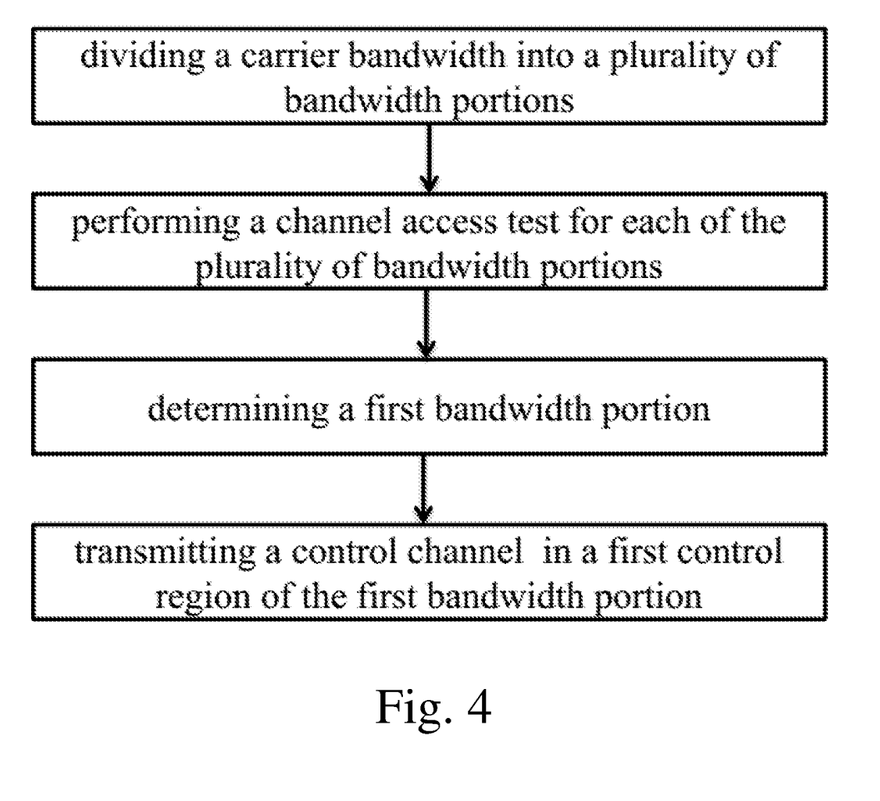
FIG. 4 illustrates a method of a preferred embodiment of the subject disclosure.

FIG. 4 shows a method for transmitting a control channel according to a preferred embodiment of the subject disclosure. The method comprises: dividing a carrier bandwidth into a plurality of bandwidth portions, wherein each of the plurality of bandwidth portions includes a control region (e.g. a CORESET) for transmitting control channel; performing a channel access test (e.g., LBT test) for each of the plurality of bandwidth portions; determining a first bandwidth portion from the plurality of bandwidth portions according to channel access test results of the plurality of bandwidth portions; transmitting a first control channel in a first control region of the first bandwidth portion, wherein the first control channel is used for scheduling a data transmission in one or more bandwidth portions of the plurality of bandwidth portions.

The control channel may be used for DL transmission and thus may be PDCCH in some embodiments. In some other embodiments, the control channel may be used for UL transmission and thus may be PDCCH. Please note that the DL transmission is utilized an example in the following paragraphs. However, the utilization of the present disclosure is not limited to DL transmission, and can be UL transmission as well.

When performing DL transmission, the method shown in FIG. 4 is performed by a base station. The base station divides a carrier bandwidth into a plurality of bandwidth portions. Each bandwidth portion has a bandwidth of 20 MHz, and includes a control region, i.e., CORESET. The base station then performs a channel access test (e.g. LBT test) for each of the plurality of bandwidth portions. According to the result of the channel access test, the base station selects a bandwidth portion from the plurality of bandwidth portions. The base station then transmits a PDCCH in a control region of the selected bandwidth portion, and the transmitted PDCCH is used for scheduling data transmission in one or more bandwidth portions of the plurality of bandwidth portions.

When more than one bandwidth portions pass the channel access test, the base station selects one CORESET for a PDCCH for at least DL scheduling. The CORESET could be selected based on the indexes of the bandwidth portions which pass the channel access test. For example, the base station may select the bandwidth portion with the lowest index among the bandwidth portions which pass the channel access test. If such approach is applied, the UE may detect the PDCCH from the bandwidth portion with the lowest index. Once the PDCCH is detected, there is no need to perform detection on the rest bandwidth portions with higher indexes. Thus, the complexity of blind detection at UE side is reduced. Alternatively, the base station may select the bandwidth portion with the highest index among the bandwidth portions which pass the channel access test. If such approach is applied, the UE may detect the PDCCH from the bandwidth portion with highest index. Once the PDCCH is detected, there is no need to perform detection on the rest bandwidth portions with lower indexes. In another embodiment, the base station may select the bandwidth portion with the best channel condition among the bandwidth portions which pass the channel access test. In this approach, the PDCCH reliability can be enhanced.

The base station may further transmit a PDCCH which indicates the channel access test results to the UE in a CORESET of a bandwidth portion. By doing so, the UE can neglect the bandwidth portions, which fail the channel access tests, so as to reduce the complexity of detecting PDCCH. Take FIG. 3 as an example. Assuming the PDCCH for scheduling the data transmission is in the CORESET in bandwidth portion 3, the PDCCH which indicates the channel access test results can be arranged in the same CORESET or in another different CORESET which is in a bandwidth portion other than bandwidth portion 3.

In this disclosure, DCI format 2_0 may be introduced for the UE to identify the usage of the CORESET, and the expected corresponding UE behavior for the CORESET. The base station may indicate the channel access test results of the bandwidth portions in the DCI format 2_0. When UE detects the DCI format 2_0, UE would know the available bandwidth portions and skip detection or reception of the bandwidth portions with an unsuccessful channel access test result. If the UE fails to detect the DCI format 2_0, then the UE would blind detect each bandwidth portion assuming that all bandwidth portions include PDCCH in the corresponding CORESET region. There is no risk of missing a scheduling DCI in any of the bandwidth portions.

In a preferred embodiment, a PDCCH may include an indicator, which indicates whether the CORESET region in each bandwidth portion is used for data transmission, for example, PDSCH transmission. The indicator may be a bitmap, which is included in the Downlink Control Information (DCI) format. Each bit in the bitmap corresponding to one CORESET or one bandwidth portion. For example, if a CORESET is used for PDSCH transmission, the corresponding bit in the bitmap is set to a predefined binary value, e.g., "1." If a CORESET is used for PDCCH transmission, the corresponding bit in the bitmap is set to another predefined binary value, e.g., "0." In some other embodiments, binary value "0" may represent PDCSH and binary value "1" may represent PDCCH.

Correspondingly, the UE would receive the indictor and monitor the PDCCH or receive PDSCH indicated by the bitmap.

In some embodiments, the length of the bitmap could be configured by high layer signaling, and is equal to the total number of bandwidth portions or equal to the total number of CORESETs for the wide band carrier. When the UE tries to detect the PDCCH in multiple bandwidth portions or CORESETs in parallel, or that the UE cannot determine in which bandwidth portions or CORESETs the PDCCH is detected, it is preferred that the length of the bitmap being equal to the total number of bandwidth portions, or the total number of CORESETs for the wide band carrier.

In some other embodiments, the length of the bitmap may also be equal to the total number of bandwidth portions minus one, or the total number of CORESETs for the wide band carrier minus one. When the UE is aware from in which bandwidth portion or CORESET the detected PDCCH is transmitted, the UE is aware of the detected PDCCH and thus it is not necessary to include a bit for identifying the CORESET with the detected PDCCH.

In another embodiment, after the base station determines a CORESET for scheduling data transmission, the base station indicates the UE whether to perform blind PDCCH detection in other CORESET regions on the bandwidth portions which pass the channel access test.

In particular, the bitmap is included in DCI format with each bit in the bitmap corresponding to one CORESET. The length of the bitmap is equal to the total number of bandwidth portions, or the total number of CORESETs for the wide band carrier.

If the base station wants UE to detect PDCCH in a CORESET, then the corresponding bit in the bitmap is set to a predefined binary value, e.g., "1". So UE needs to perform blind detection in the CORESET. If the base station wants UE not to detect PDCCH in a CORESET, e.g., the CORESET is left blank or used for other PDSCH transmission, then the corresponding bit in bitmap is set to a predefined binary value, e.g., "0". So UE shall skip blind detection in the CORESET.

As mentioned above, a CORESET can be used for transmitting PDCCH or for data transmission. For the CORESET not used for data transmission, the base station may simply puncture the data to be transmitted in that CORESET. In another embodiment, the base station may transmit the PDSCH around the CORESET using rate matching, namely, adjusting the data to match the available resource. By doing so, no data would be punctured.

The base station may also transmit an indicator in a PDCCH to the UE, which indicates that the base station uses puncturing or rate matching for the data transmission in the CORESET region. Correspondingly, at the receiver's side, the UE may assume that the data in the CORESET region is punctured when receiving PDSCH transmission, or perform rate matching around the CORESET when receiving PDSCH transmission.

In detail, for an initial slot of a DL Channel Occupancy Time (COT), before performing the channel access test, the base station prepares a PDCCH for scheduling a PDSCH transmission on multiple bandwidth portions. After the channel access tests, the base station determines a CORESET on an available bandwidth portion from the set of available bandwidth portions to transmit the PDCCH. For CORESETs on other available bandwidth portions, it may be unnecessary for PDCCH transmission if the determined CORESET can provide enough PDCCH capacity. When the base station prepares the PDSCH before the access tests, it cannot predict which CORESET will be used for PDCCH transmission. As a result, in one embodiment, PDSCH resource mapping is always performed with rate-matching around all the configured CORESETs. In this way, base station implementation is simplified.

In another embodiment, PDSCH resource mapping is performed in the region of all the configured CORESETs, i.e., the region of all the configured CORESETs are used for PDSCH resource mapping. After the channel access tests, one CORESET is determined for PDCCH transmission and the PDSCH resource mapping in the determined CORESET region is directly punctured while other unused CORESETs are used for PDSCH transmission as planned before the channel access tests. In this way, only data to be transmitted in the CORESET for PDCCH is punctured. For the initial slot, it does not make sense for the base station to perform PDSCH resource mapping with rate-matching around the determined CORESET because base station does not have enough time to complete such resource mapping.

For the second to the last slot of the DL COT, based on the channel access test result, the base station may have enough processing time to dynamically determine a CORESET for PDCCH transmission and indicates whether other CORESET regions are used for PDSCH transmission or not by means of the bitmap in DCI format. If the bitmap indicates a CORESET region is used for PDSCH transmission, then UE needs to receive PDSCH in the CORESET region; if the bitmap indicates a CORESET is not used for PDSCH transmission, then UE needs to receive PDSCH with rate-matching around the CORESET instead of puncturing.

Please refer to FIG. 4 again. The base station then transmits PDCCH in CORESET of the selected bandwidth portion, and the PDCCH is used for scheduling PDSCH transmission in one or more bandwidth portions.

Figure 5:
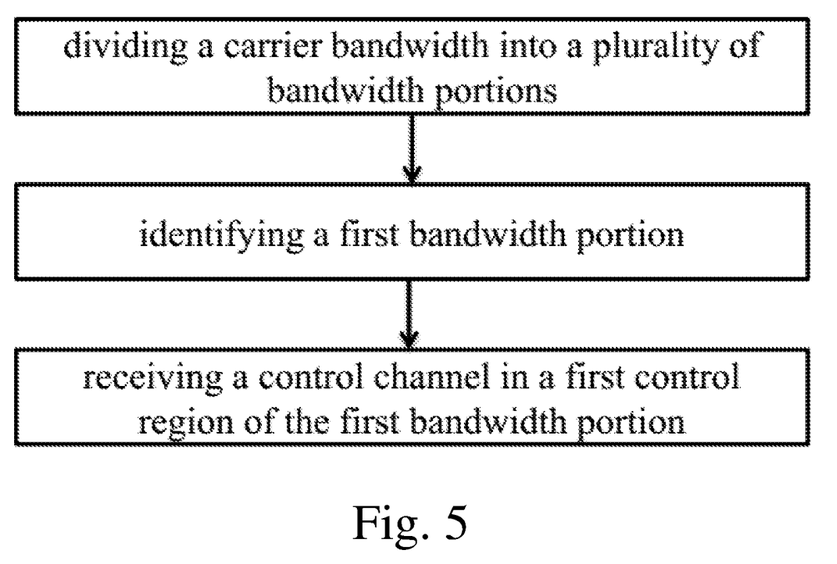
FIG. 5 illustrates another method of a preferred embodiment of the subject disclosure.

FIG. 5 depicts a method for receiving a control channel according to a preferred embodiment of the subject disclosure. The method comprises dividing a carrier bandwidth into a plurality of bandwidth portions, wherein each of the plurality of bandwidth portions includes a control region for control channel monitoring; identifying a first bandwidth portion from the plurality of bandwidth portions; and receiving a first control channel in a first control region of the first bandwidth portion, wherein the first control channel is used for scheduling a data transmission in one or more bandwidth portions of the plurality of bandwidth portions.

The control channel may be used for DL transmission and thus may be PDCCH in some embodiments. In some other embodiments, the control channel may be used for UL transmission and thus may be PUCCH. Please note that DL transmission is utilized an example in the following paragraphs. However, the utilization of the present disclosure is not limited to DL transmission, and can be UL transmission as well. For receiving DL transmission, the UE divides a carrier bandwidth into a plurality of bandwidth portions, each bandwidth portion has a bandwidth of 20 MHz. Each of the plurality of bandwidth portions includes a CORESET which needs to be monitored by the UE. The UE then identifies a first bandwidth portion from the plurality of bandwidth portions, and receives a first control channel, e.g., PDCCH, in the control region of the first bandwidth portion. The UE may further receive data transmission based on the PDCCH.

In one embodiment, the UE may identify the first bandwidth portion from the plurality of bandwidth portions by blind detection. Preferably, the UE identifies the first bandwidth portion from the plurality of bandwidth portions by detecting a reference signal (RS) for control channel demodulation in the control region of each a bandwidth portion of the plurality of bandwidth portions. Alternatively, the UE may detect a downlink control information (DCI) format in the control region of each bandwidth portion of the plurality of bandwidth portions. Once the DCI format is detected, the first bandwidth portion is identified.

In one embodiment, the UE detects PDCCH in the CORESETs according to the indexes of the bandwidth portion. For example, the UE may detect the PDCCH from CORESET in the bandwidth portion with the lowest index, or from CORESET in the bandwidth portion with the highest index. If a CORESET in one bandwidth portion is detected then UE may skip the PDCCH blind detection in the undetected CORESETs on other bandwidth portions.

The present disclosure further relates to dynamically scheduling PDSCH transmission on CORESET region which is not used for PDCCH transmission.

The UE may obtain, from the PDCCH, the indicator indicating whether the CORESET region in each bandwidth portion is used for data transmission or for PDCCH transmission. The UE may also obtain, from the PDCCH, an indicator indicating that the base station uses puncturing or rate matching for the data transmission in the CORESET region. The UE may further obtain, from the PDCCH, an indicator indicating whether the base station wants the UE to detect PDCCH in a CORESET of each bandwidth portion. The UE may further receive a PDCCH in a CORESET comprising an indicator indicating the channel access test result of each bandwidth portion, so that the UE can skip monitoring PDCCHs in the bandwidth portions, which fail the channel access tests, so as to reduce the complexity of detecting PDCCH. The contents of the indicators have been described in the above paragraphs and thus are not mentioned repeatedly.

Figure 6:
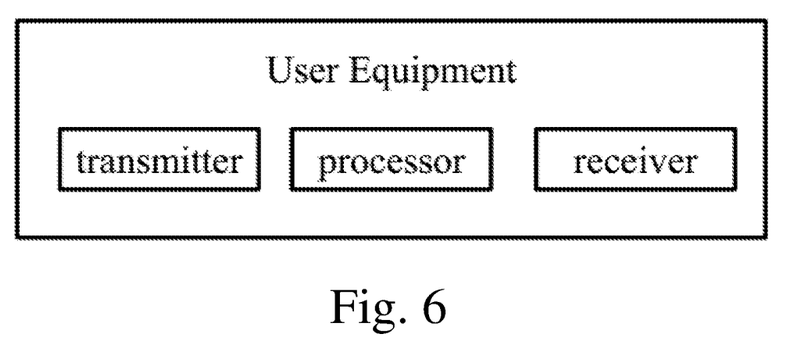
FIG. 6 illustrates an exemplary block diagram of a User Equipment (UE) according to an embodiment of the present disclosure.

FIG. 6 depicts a block diagram of a UE according to the embodiments of the present disclosure. The UE 101 may include a receiver, a processor, and a transmitter. In certain embodiments, the UE 101 may further include an input device, a display, a memory, and/or other elements. In one embodiment, the UE may include at leak one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions can be programmed to implement a method with the at least one receiver, the at least one transmitter and the at least one processor. The method according to an embodiment of the present disclosure, for example, is the method shown in FIG. 4 or 5.

Figure 7:
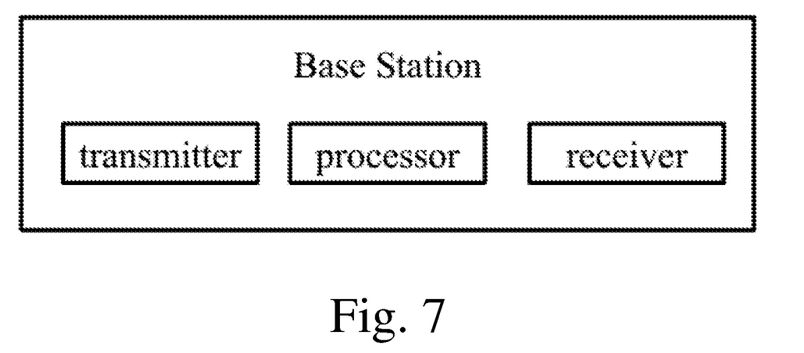
FIG. 7 illustrates an exemplary block diagram of a Base Station (BS) according to an embodiment of the present disclosure.

FIG. 7 depicts a block diagram of a BS according to the embodiments of the present disclosure. The BS 102 may include a receiver, a processor, and a transmitter. In one embodiment, the BS may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions can be programmed to implement a method with the at least one receiver, the at least one transmitter and the at least one processor. The method according to an embodiment of the present disclosure, for example, is the method shown in FIG. 4 or 5.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method performed by an apparatus, the method comprising:
    dividing a carrier bandwidth into a plurality of bandwidth portions, wherein each of the plurality of bandwidth portions includes a control region for transmitting a control channel;
    performing a channel access test for each of the plurality of bandwidth portions;
    after performing the channel access test for each of the plurality of bandwidth portions, determining a first bandwidth portion from the plurality of bandwidth portions according to channel access test results of the plurality of bandwidth portions; and
    transmitting a downlink control information (DCI) format on a first control channel in a first control region of the first bandwidth portion, wherein the first control channel is used for scheduling a data transmission in one or more bandwidth portions of the plurality of bandwidth portions, the DCI format includes a first indicator comprising a bitmap having a length corresponding to a number of the plurality of bandwidth portions of the carrier bandwidth, and each bit in the bitmap corresponds to a bandwidth portion of the plurality of bandwidth portions and indicates whether the control region of a corresponding bandwidth portion is used for transmitting a control channel.

2. The method of claim 1, wherein the first bandwidth portion is a bandwidth portion with a lowest index among bandwidth portions with successful channel access test results, a bandwidth portion with a highest index among bandwidth portions with successful channel access test results, or a bandwidth portion with a best channel condition among bandwidth portions with successful channel access test results.

3. The method of claim 1, wherein the first control channel includes a first indicator indicating whether the control region in each of the plurality of bandwidth portions is used for the data transmission.

4. The method of claim 1, wherein the number of the plurality of bandwidth portions is determined based on high layer signaling or a size of the carrier bandwidth.

5. The method of claim 1, wherein the data transmission in a second control region of a second bandwidth portion of the one or more bandwidth portions of the plurality of bandwidth portions is punctured or adjusted to match an available resource in response to the second control region not being used for the data transmission.

6. The method of claim 1, wherein the first control channel includes a second indicator indicating either puncturing or adjusting to match an available resource is used for the data transmission in control region(s) of the one or more bandwidth portions of the plurality of bandwidth portions.

7. The method of claim 1, further comprising transmitting a second control channel in the control region of a third bandwidth portion, wherein the second control channel indicates channel access test results of the plurality of bandwidth portions.

8. The method of claim 1, wherein the length of the bitmap is configured by high layer signaling.

9. The method of claim 1, wherein the length of the bitmap is equal to the number of the plurality of bandwidth portions of the carrier bandwidth.

10. The method of claim 1, wherein the length of the bitmap is one less than the number of the plurality of bandwidth portions of the carrier bandwidth.

11. A method performed by an apparatus, the method comprising:
    dividing a carrier bandwidth into a plurality of bandwidth portions, wherein each of the plurality of bandwidth portions includes a control region for control channel monitoring;
    after performing a channel access test for each of the plurality of bandwidth portions, identifying a first bandwidth portion from the plurality of bandwidth portions; and
    receiving a downlink control information (DCI) format on a first control channel in a first control region of the first bandwidth portion, wherein the first control channel is used for scheduling a data transmission in one or more bandwidth portions of the plurality of bandwidth portions, the DCI format includes a first indicator comprising a bitmap having a length corresponding to a number of the plurality of bandwidth portions of the carrier bandwidth, and each bit in the bitmap corresponds to a bandwidth portion of the plurality of bandwidth portions and indicates whether the control region of a corresponding bandwidth portion is used for transmitting a control channel.

12. The method of claim 11, wherein identifying the first bandwidth portion from the plurality of bandwidth portions comprising:
    detecting a reference signal for control channel demodulation in the control region of each bandwidth portion of the plurality of bandwidth portions; and identifying the first bandwidth portion in response to the reference signal being detected.

13. The method of claim 11, wherein identifying the first bandwidth portion from the plurality of bandwidth portions comprising:
    detecting a downlink control information format in the control region of each bandwidth portion of the plurality of bandwidth portions; and
    identifying the first bandwidth portion in response to the downlink control information format being detected.

14. The method of claim 11, wherein identifying the first bandwidth portion from the plurality of bandwidth portions is in an order of indexes of the plurality of bandwidth portions.

15. The method of claim 11, wherein the first indicator indicates whether to monitor control channel in the control region of a bandwidth portion of the plurality of bandwidth portions.

16. The method of claim 11, wherein the number of the plurality of bandwidth portions is determined based on high layer signaling or a size of the carrier bandwidth.

17. The method of claim 11, wherein the data transmission in a second control region of a second bandwidth portion of the one or more bandwidth portions of the plurality of bandwidth portions is punctured or adjusted to match an available resource in response to the second control region not being used for the data transmission.

18. An apparatus, comprising:
    at least one memory; and
    at least one processor coupled with the at least one memory and configured to cause the apparatus to:
        divide a carrier bandwidth into a plurality of bandwidth portions, wherein each of the plurality of bandwidth portions includes a control region for transmitting a control channel;
        perform a channel access test for each of the plurality of bandwidth portions;
        after performing the channel access test for each of the plurality of bandwidth portions, determine a first bandwidth portion from the plurality of bandwidth portions according to channel access test results of the plurality of bandwidth portions; and
        transmit a downlink control information (DCI) format on a first control channel in a first control region of the first bandwidth portion, wherein the first control channel is used for scheduling a data transmission in one or more bandwidth portions of the plurality of bandwidth portions, the DCI format includes a first indicator comprising a bitmap having a length corresponding to a number of the plurality of bandwidth portions of the carrier bandwidth, and each bit in the bitmap corresponds to a bandwidth portion of the plurality of bandwidth portions and indicates whether the control region of a corresponding bandwidth portion is used for transmitting a control channel.

19. An apparatus, comprising:
    at least one memory; and
    at least one processor coupled with the at least one memory and configured to cause the apparatus to:
        divide a carrier bandwidth into a plurality of bandwidth portions, wherein each of the plurality of bandwidth portions includes a control region for control channel monitoring;
        after performing a channel access test for each of the plurality of bandwidth portions, identify a first bandwidth portion from the plurality of bandwidth portions; and
        receive a downlink control information (DCI) format on a first control channel in a first control region of the first bandwidth portion, wherein the first control channel is used for scheduling a data transmission in one or more bandwidth portions of the plurality of bandwidth portions, the DCI format includes a first indicator comprising a bitmap having a length corresponding to a number of the plurality of bandwidth portions of the carrier bandwidth, and each bit in the bitmap corresponds to a bandwidth portion of the plurality of bandwidth portions and indicates whether the control region of a corresponding bandwidth portion is used for transmitting a control channel.

* * * * *